United States Patent
Giesa et al.

(10) Patent No.: US 9,789,970 B2
(45) Date of Patent: Oct. 17, 2017

(54) SYSTEM AND METHOD FOR PREVENTION OF INADVERTENT ESCAPE SLIDE DEPLOYMENT FOR AN AIRCRAFT

(75) Inventors: Hans-Gerhard Giesa, Hamburg (DE); Michael Weidel, Giesen (DE); Valérie Renauldon-Dumain, Aussonne (FR)

(73) Assignees: Airbus Operations GmbH (DE); Airbus S.A.S. (FR)

( * ) Notice: Subject to any disclaimer, the term of this patent is extended or adjusted under 35 U.S.C. 154(b) by 1226 days.

(21) Appl. No.: 12/936,743

(22) PCT Filed: Mar. 31, 2009

(86) PCT No.: PCT/EP2009/053825
§ 371 (c)(1),
(2), (4) Date: Dec. 14, 2010

(87) PCT Pub. No.: WO2009/124859
PCT Pub. Date: Oct. 15, 2009

(65) Prior Publication Data
US 2011/0139934 A1     Jun. 16, 2011

Related U.S. Application Data

(60) Provisional application No. 61/123,340, filed on Apr. 7, 2008.

(30) Foreign Application Priority Data

Apr. 7, 2008 (EP) .................................... 08154155

(51) Int. Cl.
| | | |
|---|---|---|
| *G08B 21/00* | (2006.01) | |
| *B64D 25/14* | (2006.01) | |
| *A62B 1/20* | (2006.01) | |

(52) U.S. Cl.
CPC ............... *B64D 25/14* (2013.01); *A62B 1/20* (2013.01)

(58) Field of Classification Search
CPC .. B64D 45/00; B64D 11/0015; G08G 5/0021; G08G 5/0013; G08G 5/0078
(Continued)

(56) References Cited

U.S. PATENT DOCUMENTS

| | | |
|---|---|---|
| 4,375,877 A | 3/1983 | Shorey |
| 4,497,462 A | 2/1985 | Hamatani |
| | (Continued) | |

FOREIGN PATENT DOCUMENTS

| | | |
|---|---|---|
| DE | 102005014581 A1 | 9/2006 |
| DE | 102005017451 A1 | 10/2006 |
| | (Continued) | |

OTHER PUBLICATIONS

Chapter 7 of DC-1 0 Flight Crew Operating Manual, Published and updated Feb. 1, 1975 to Aug. 1, 1984.
(Continued)

*Primary Examiner* — Kerri McNally
*Assistant Examiner* — Sharmin Akhter
(74) *Attorney, Agent, or Firm* — Lerner, David, Littenberg, Krumholz & Mentlik, LLP

(57) ABSTRACT

The invention relates to a system and a method for preventing inadvertent slide deployment for an aircraft, comprising at least one sensor for sensing the proximity of a person in front of an aircraft door, and at least one optical warning means operable to provide an optical indication in the vicinity of a slide arming lever when the sensor detects the proximity of a person in front of the aircraft door. The system according to the invention provides an effective prevention for inadvertent slide deployment that is capable to guide trained and untrained persons to the information they need in order to disarm the slide in sufficient time before the door handle is gripped and pulled to open the aircraft door in normal operation conditions.

17 Claims, 4 Drawing Sheets

Figure 1:
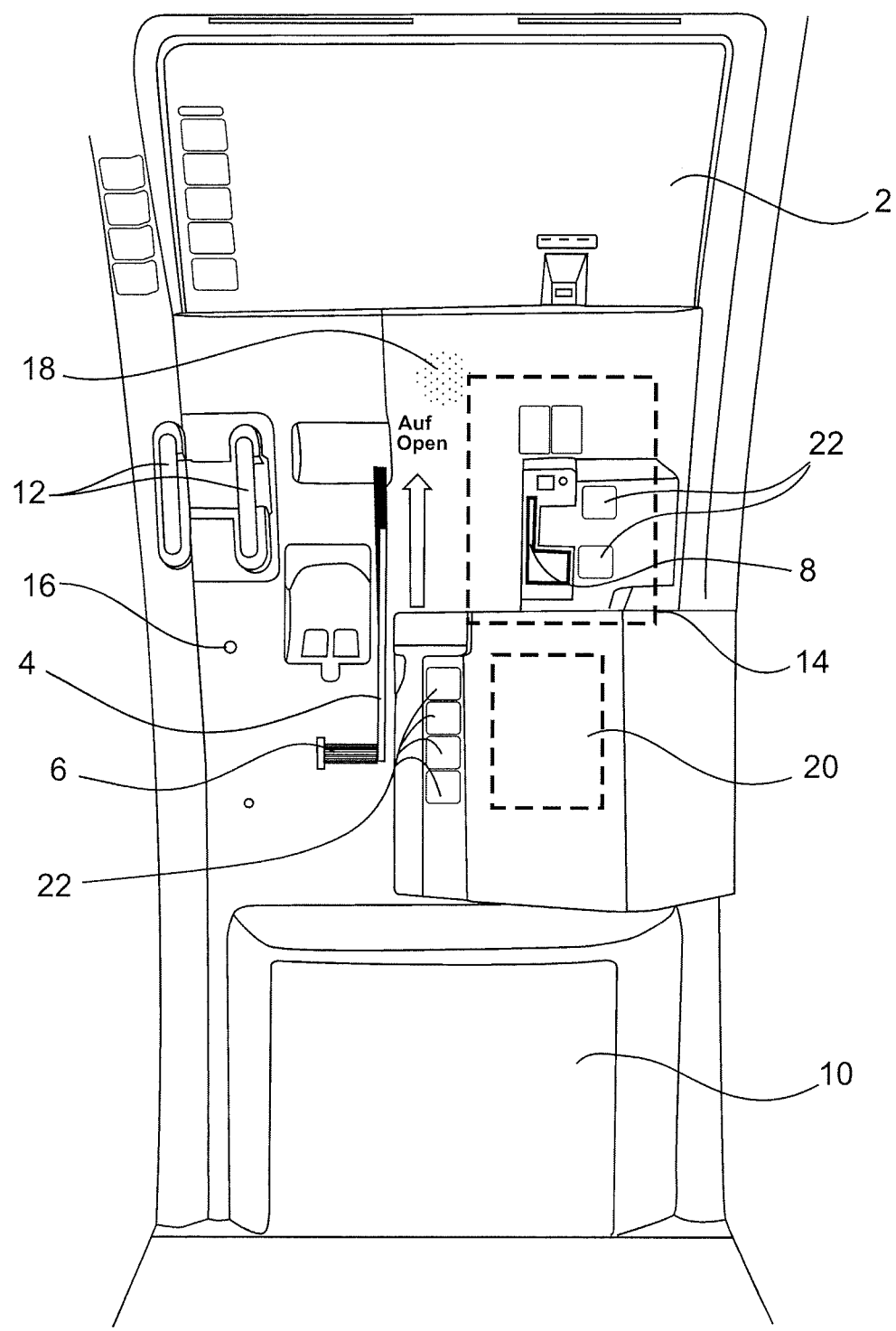

(58) Field of Classification Search
USPC .......... 340/945–983; 244/118.3, 129–129.5, 244/137.1–137.2
See application file for complete search history.

(56) References Cited

U.S. PATENT DOCUMENTS

| | | | |
|---|---|---|---|
| 4,553,474 A | 11/1985 | Wong et al. | |
| 4,929,936 A * | 5/1990 | Friedman | G08B 7/064 340/815.45 |
| 5,106,036 A | 4/1992 | Sepstrup | |
| 2003/0132345 A1 | 7/2003 | Lehmann | |
| 2003/0210139 A1* | 11/2003 | Brooks | B64F 1/368 340/531 |
| 2006/0287829 A1* | 12/2006 | Pashko-Paschenko | B60Q 5/006 701/301 |
| 2007/0171053 A1* | 7/2007 | Heppeler | G08B 7/066 340/541 |
| 2008/0007400 A1* | 1/2008 | Murphy | G03B 21/00 340/540 |
| 2008/0048889 A1 | 2/2008 | Naegler et al. | |
| 2008/0284619 A1* | 11/2008 | Farmer | B64C 1/1407 340/963 |

FOREIGN PATENT DOCUMENTS

| | | |
|---|---|---|
| EP | 0009379 A1 | 4/1980 |
| EP | 0743246 A1 | 11/1996 |
| EP | 1410987 A2 | 4/2004 |
| EP | 2108585 A1 | 10/2009 |
| EP | 1 719 084 B1 | 1/2011 |
| GB | 675778 A | 7/1952 |
| GB | 2322108 A | 8/1998 |
| GB | 2376552 A | 12/2002 |
| JP | 6010557 | 1/1994 |
| JP | 2003099863 A | 4/2003 |
| WO | 2005083647 A1 | 9/2005 |
| WO | 2006037543 A1 | 4/2006 |
| WO | 2006114640 A1 | 11/2006 |
| WO | 2007001370 A2 | 1/2007 |
| WO | 2007041091 A1 | 4/2007 |
| WO | 2009/124859 A1 | 10/2009 |

OTHER PUBLICATIONS

Description of air conditioning and pressurization of Bombardier Challenger 605 aircraft, pp. 1-25, 2006.
Description of the landing gear of Bombardier Challenger 605 aircraft, pp. 1-21, 2006.
Multi-Purpose Flight Recorder Installation and Operating Manual PIM422-I,Penny+Giles A Curtiss-Wright Company, Aug. 2004.
U.S. Appl. No. 14/799,685, filed Jul. 15, 2015.

* cited by examiner

SYSTEM AND METHOD FOR PREVENTION OF INADVERTENT ESCAPE SLIDE DEPLOYMENT FOR AN AIRCRAFT

CROSS-REFERENCE TO RELATED APPLICATIONS

This application is a national phase entry under 35 U.S.C. §371 of International Application No. PCT/EP2009/053825, filed Mar. 31, 2009, published in English, which claims the benefit of the filing date of European Patent Application No. 08 154 155.9, filed Apr. 7, 2008, and of U.S. Provisional Patent Application No. 61/123,340, filed Apr. 7, 2008, the entire disclosures of which applications are hereby incorporated herein by reference.

FIELD OF THE INVENTION

The present invention relates to a system for preventing inadvertent slide deployment for an aircraft, a method of preventing inadvertent slide deployment for an aircraft, a use of such a system in an aircraft and to an aircraft having such a system.

BACKGROUND OF THE INVENTION

Prior to departure of a large passenger aircraft all aircraft doors are placed into a so-called "armed mode" by the cabin crew. If an evacuation is required and the doors are opened while armed, the opening of the door activates an evacuation slide pack, which expands out of a slide container. Once the slide is outside it will automatically inflate into its final useable position. Inadvertent slide deployment occurs when the operator of the aircraft door attempts to open the door in normal condition (no emergency) when it is in the armed mode. High follow-up-costs have become a burden for the airlines during the last years. Slides are inadvertently deployed both by trained cabin crew and by other persons like ground or maintenance staff.

This occurrence is not specifically limited to certain aircraft manufacturers and their door technologies. Common reasons for inadvertent slide deployment usually lie in time pressure or high workload for maintenance crew, ground crew and cabin crew, often occurring ad hoc situations and thus deviations from standard procedures in the aircraft, service in different aircraft types within shortest periods (mixed fleet flying).

Today indications exist that are activated when operating the door control handle while the slide is armed. Nevertheless inadvertent slide deployments occur. One reason for this is a short reaction time needed to stop the movement of the handle. A known invention for preventing inadvertent slide deployment in an aircraft is an alarm system comprising a sensor that is able to detect an operator gripping the handle of an aircraft door. If the handle detects that it is about to be gripped while the door is in armed mode an acoustic alarm signal is initiated. The acoustic signal in this case is realised as a recorded voice being played back, so that the operator hears a voice telling that the door is armed and that the slide will deploy. The operator then has to mentally realise that pulling the door handle will inadvertently lead to the deployment of the slide. The operator has to reconsider his intention, stop to pull the handle, and move his hand to disarm the slide.

This system is disadvantageous, because the alarm occurs only when the door handle is about to be gripped which may be too late for effectively preventing the inadvertent slide deployment. The time period needed for reconsidering the intention to pull the door handle may be too long so that the reason for the alarm signal is understood too late. Also, a trained operator—in case the operator belongs to the cabin crew—usually operates the door handle in a situation where a lot of passengers produce noise while removing their seat belts, opening overhead stowage bins, pulling out pieces of hand luggage, pulling on jackets, talking, switching on mobile phones that signalize initial reception with a beep etc. so that a rather late acoustic alarm will not properly be perceived and considered, so that the known system might not effectively prevent inadvertent slide deployment.

Further, an untrained operator does not automatically receive a proper and easy-to-realise information about the door and slide status and what has to be done in order to prevent the slide deployment. Especially for local maintenance staff and ground staff operating all over the world it might be challenging for them while opening the aircraft door in order to get out of the aircraft, receive food trolleys from a catering service, etc to understand a voice message in English or whatever language. In this case, due to misunderstanding of the voice message, it takes probably too much time to react accurately to the voice message and stop the action of opening. Even more it is probable that the person does not listen to the broadcasted language consequently the content of the message.

It is an object of the invention to provide a system for preventing inadvertent slide deployment in an aircraft that is able to effectively prevent door operation when the aircraft door is in an armed mode even if the door operator is in a stress situation, is untrained or is not capable to understand a spoken warning. A further object of the invention is to provide a system for preventing inadvertent slide deployment that is cost effective, easy to retrofit and able to be automatically switched on (on ground) or off (during flight) where an inadvertent door handle movement is per se not possible.

SUMMARY OF THE INVENTION

In accordance with a first aspect, the present invention provides a system for preventing inadvertent slide deployment for an aircraft comprising a proximity sensor for sensing when an operator reaches towards the door, warning means for informing the door operator of a potential error and information means about what has to be done next, wherein the warnings and information are of an optical type. In a further preferred embodiment the system is enhanced by an additional acoustical warning means that produces a warning sound at the same time as the optical warnings/information.

The proximity sensor is preferably realised as a contactless sensor such as an ultrasonic sensor being positionable within the aircraft door or in near surroundings of the aircraft door. It is not mandatory to use just one single proximity sensor, also two or more sensors can be utilised. Since each sensor has a predetermined immanent detection area depending on the sensor type, the detection area of each sensor can be spatially orientated for optimal proximity sensing in the area in front of the aircraft door. The system according to the invention is not limited to utilisation of ultrasonic sensors, since various kinds of sensors that are able to detect objects in their vicinity—such as camera sensors, contact loops or pressure sensors in the cabin floor—may be used.

Optical warning and information means are preferably realised through light emitting devices, such as lamps, light emitting diodes (LEDs), projectors, etc., wherein a projector can be located outside the door in its direct vicinity or may be located within the door projecting towards an inner surface, wherein this surface may be translucent or equipped with a screen area. The optical warning and information means can include signs with one or more easy-to-understand symbols that direct the door operator towards the slide arming lever. Also, the optical warning and information means do not need to be static, they can also be animated or flashing. By providing optical warnings/information the operator is warned in sufficient time before the handle is gripped. The optical warnings preferably direct the view of the operator towards placards that are positioned in surrounding areas of the slide arming lever.

The aural/acoustic warning means can be realised by one or more speakers through that a recorded voice can be played back telling the operator that the door is in an armed mode and the slide will deploy by pulling the door handle. Also, additionally or alternatively, the acoustic warning and information means can initiate a buzzing alarm sound through that the attention of the operator in the vicinity of the door rises.

In order to improve the rise of attention of the operator several adhesive labels (placards) preferably with self-explanatory symbols giving information about what happens if the door lever will be pulled and what actions are required to avoid can be stuck on the door in the area of the slide arming lever.

The system according to the invention preferably comprises one or more controllers that receive various aircraft related data from other controllers or avionic devices situated in the aircraft in order to decide, whether there is a danger for an inadvertent operation of the door. The aircraft related data preferably comprises flight parameters such as speed, state of the main and front landing gears (i.e. weight on main wheel, weight on nose wheel) etc. resembling the operation mode of the aircraft. This leads to the ability of the system according to the invention to switch the warning means automatically off during flight so that normal flight operation is not disturbed when passengers or cabin crew regularly pass the aircraft doors. This is also very advantageous because the warning and information signals then only occur in situations when the aircraft is on the ground and the operator reaches the aircraft door. Hence, the operator is not used to regular warning signals that always occur when passing the door and will be rather surprised by hearing and seeing warning signals when reaching the door with the slide lever in armed position. The attention of the operator rises, which leads to an improvement of the inadvertent slide deployment prevention.

Figure 2:
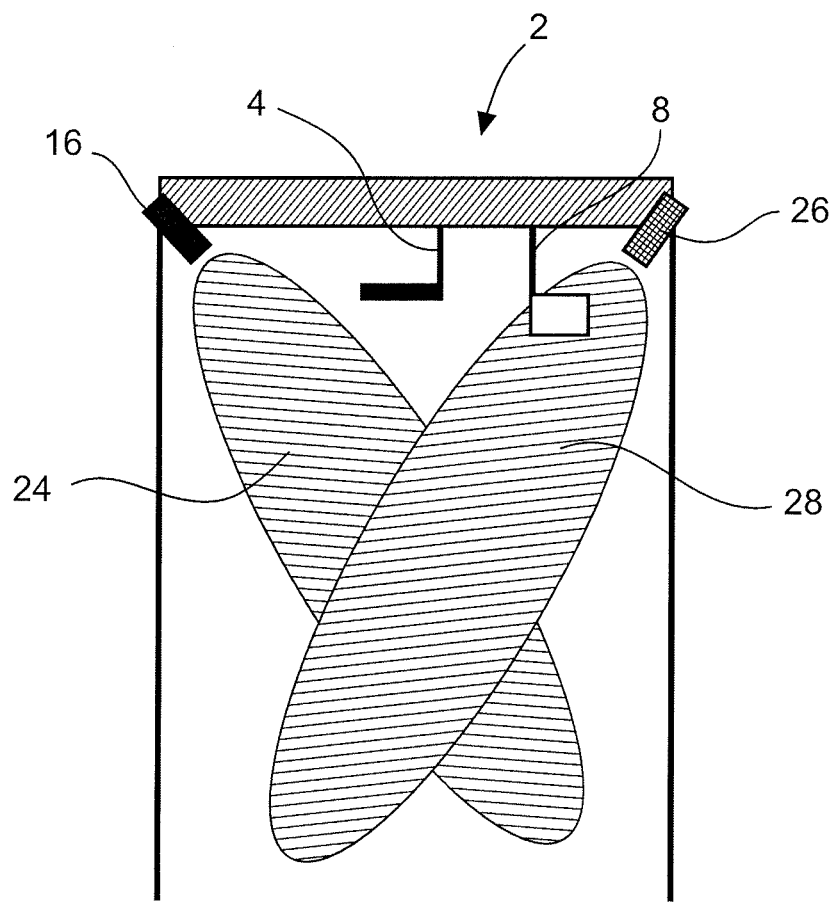
Figure 3:
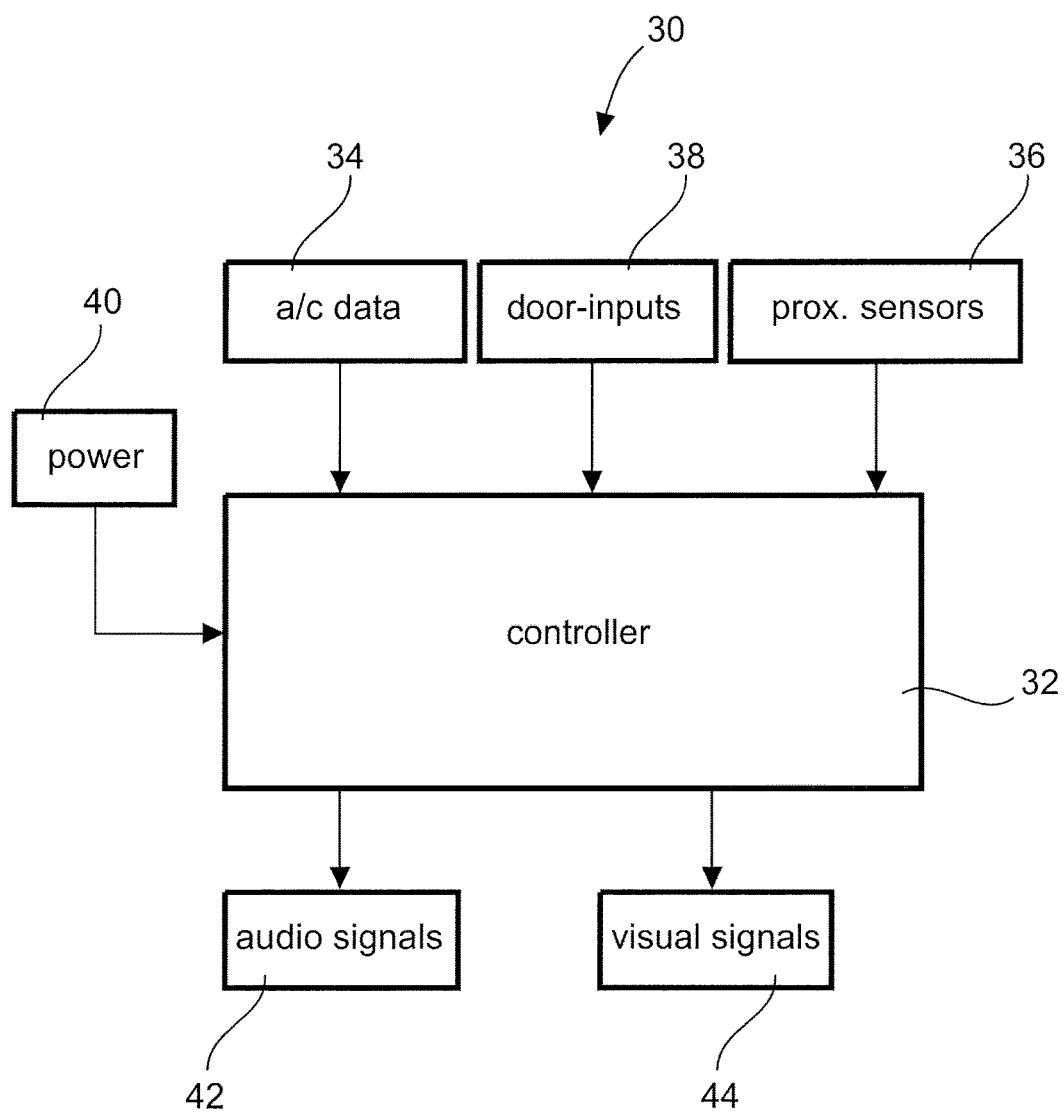
Figure 4:
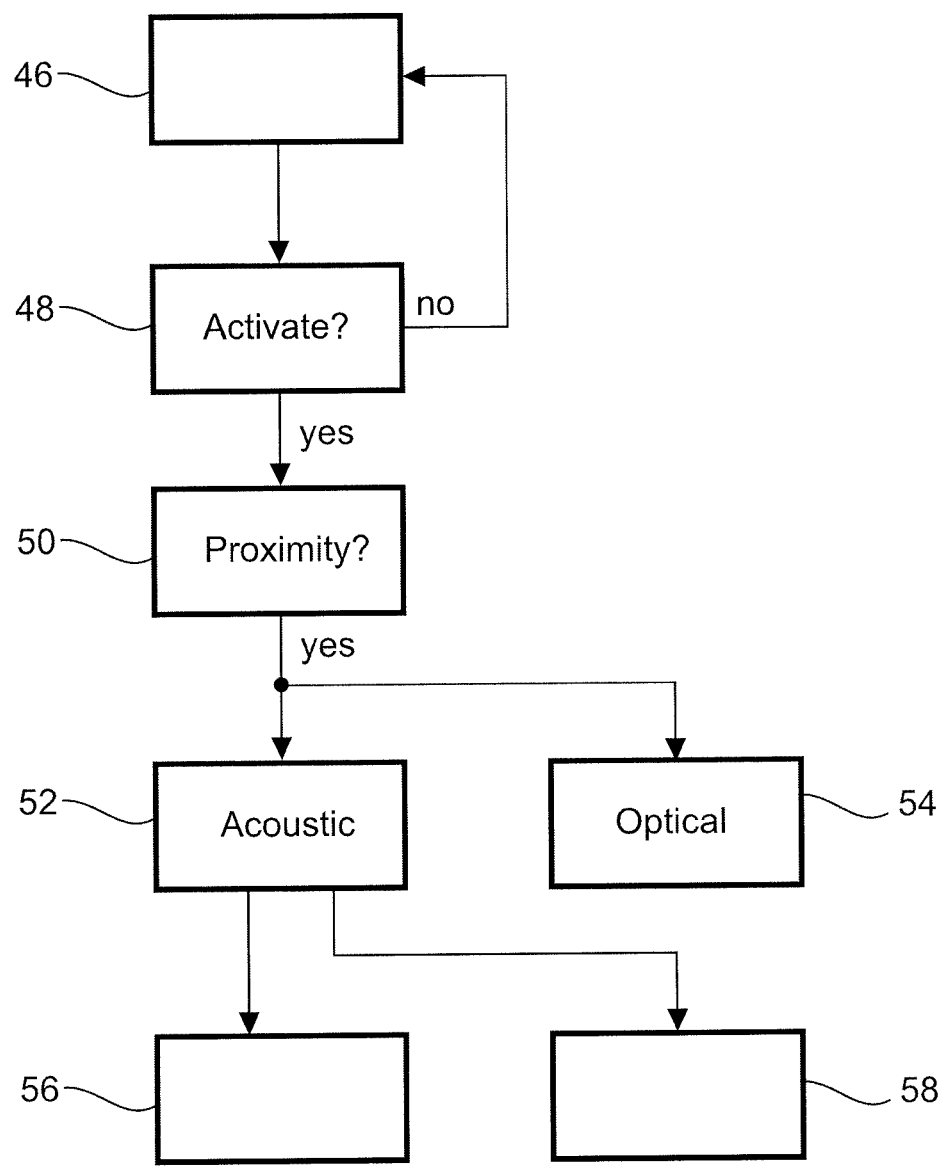

For the purposes of illustration of the foregoing objects and many of the advantages of the system according to the invention, one embodiment of the invention will now be further described with reference to the following figures. In the figures, the same numerals refer to the same objects. It is shown:

FIG. 1: a front view of a typical aircraft door equipped with the system according to the invention;

FIG. 2: a top view of an aircraft door equipped with the system according to the invention;

FIG. 3: a schematic diagram of the components of the system according to the invention; and FIG. 4: a schematic diagram of the method according to the invention.

As can be seen from FIG. 1, a typical aircraft door 2 comprises a door handle 4 with a grip 6 and a slide arming lever 8 which is used for arming the emergency slide so that it deploys by opening the door 2 in an emergency. At the bottom of the aircraft door 2 a container 10 is situated, in which the emergency slide is stowed. It has to be clearly indicated that the system according to the invention can merely be used for any kind of aircraft door without any limitation.

After boarding and closing the doors the slide lever 8 is in an armed position which means that the slide would deploy on opening the door 2. Usually, the slide arming lever 8 will maintain this position during the whole flight until the aircraft door 2 has to be opened under normal conditions. In case of emergency evacuation the slide lever 8 will be kept in armed position prior to opening the door in order to automatically initiate the slide deployment. This is a safety function prescribed by national and international aviation regulations. In order to avoid inadvertent slide deployments by trained or untrained persons, the system according to the invention provides optical and acoustic warnings and information that rise attention towards an area 14 on the door 2 where the slide lever 8 is situated.

The system according to the invention is enabled to detect the presence of a person in the vicinity of the door 2 by use of one or more sensors 16 that can be realized as ultrasonic proximity sensors. Also, camera sensors or other sensors may be used and the system according to the invention is not limited to the use of ultrasonic sensors. Additionally, while enough processing power is available with electronic devices that are small enough to be integrated into the door 2 or into the surrounding walls, recognition algorithms may be utilised for further improving the warning signal quality, changing the language or other parameters for different operators reaching the vicinity of the door 2.

The system according to the inventions allows to initiate warning functions in a sufficient time period before even the operator has started to grip the handle 4 of the door 2. When detecting the vicinity of a person in front of the door 2 an optical warning and/or an optical information is displayed in the area 14 containing the slide lever 8 or another designated area 20 directly in the near surrounding of the area 14 in order to focus the attention and the interest of the operator towards the slide lever 8. The optical warning as such can be displayed using a projecting device, which is not shown in detail in FIG. 1, or by use of other light emitting devices, like light emitting diodes (LEDs), lamps and the such. The warning lights can be arranged in a manner that resembles a sign telling the operator that the slide lever 8 leads to an automatic slide deployment when in the armed position. The sign may be realised as a pictogram showing a person sitting or sliding on an evacuation slide. The sign may realised as a pictogram showing the procedure of arming and disarming the slide associated to both possibility to exit an aircraft: sliding onto evacuation slide or normal exit. As an alternative to a fixed arrangement, a projector and preferably a LED projector projects a similar easy-to-understand sign onto the area 14 or 20 directly under the slide lever 8. Additionally, various adhesive labels (placards) 22 can be positioned next to the area 20 or the area 14 to depict what needs to be done with the slide lever 8 in order to switch off the warnings and to be able to open the door 2 without deploying the slide.

It can also be beneficial to also initiate acoustical warnings and information at the same time or temporally delayed. The acoustic warning can preferably be realised as a buzzing sound or a chime. The sound level or the frequency in that a chime will be repeated can be increased as the person is coming nearer to the door or as the person stays for a longer time in the vicinity of the door. The acoustic warning can alternatively or additionally include the playback of a recorded voice informing the user authoritatively that the door is armed and the slide will deploy. This can be done using a playback means which is not depicted in FIG. 1 and a speaker 18. The speaker does not need to be installed in the door. It can also be integrated into the lining close to the door. Alternatively other loudspeakers available in the cabin may be connected to the system.

FIG. 2 shows a top view of the aircraft door 2 with the door handle 4 and the slide arming lever 8. On the left side of the door 2 there is situated the proximity sensor 16 with a typical detection area 24. If a person crosses or passes through the detection area 24 the sensor 16 detects the proximity of the person and thus produces a proximity signal that is sent to a controller. The controller then initiates the warning signal, in case the slide lever 8 is in an armed position and the aircraft is on ground ready for disembarking. In order to improve the detection of a person in front of the door 2 a second sensor 26 may be placed into another position relative to the door 2, wherein the detection area 28 of sensor 26 preferably intersects with the detection area 24 of the sensor 16. Additionally, even more sensors may be utilised by the system according to the invention. The sensors can be located directly at the door, at the sides of the door in surrounding cabin linings or monuments or other suitable places in the direct surrounding of the door 2. Considering the installed sensors 16, 26 etc. it is important to adjust the spatial orientation of their detection areas 24 and 28 in order not to monitor areas containing seats or various monuments and resulting misinterpretations.

FIG. 3 shows the general setup of the system according to the invention. The system 30 comprises of a controller 32 with a number of inputs for aircraft related data 34, proximity sensors 36, door-inputs 38 and power 40. The controller 32 is able to output audio signals 42 and visual signals 44. The controller 32 is enabled to receive aircraft data 34 with which the controller 32 can decide, whether the aircraft is on ground or in flight, so that the system 30 according to the invention can be deactivated or activated automatically when necessary. For example, the system activates the monitoring of the vicinity of the door 2 if the rolling speed is under a predetermined value or when weight is on the nose wheel(s).

FIG. 4 shows an overview of the method according to the invention. The system 30 according to the invention always receives 46 aircraft data that are used to determine 48, whether the aircraft is on ground and the system 30 should be activated or not. If the controller 32 decides, that the system 30 should be activated, the sensors monitor 50 the area in front of the door 2. In case a sensor detects the proximity of a person in front of the door 2, an acoustic warning is given 52. At the same time, an optical warning and/or an optical information is displayed 54 in the area 14 or 20 of the slide arming lever 8. The acoustic warning can include a buzzing noise 58 and additionally or alternatively the playback 56 of a recorded voice message.

To sum up, the system according to the invention provides an effective prevention for inadvertent slide deployment that is capable to guide trained and untrained persons to the information they need in order to disarm the slide in sufficient time before the door handle is gripped and pulled to open the aircraft door in normal operation conditions.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS 2 aircraft door
4 door handle
6 door handle grip
8 slide arming lever
10 slide container
14 area of interest around slide arming lever
16 proximity sensor
18 loud speaker
20 area of interest under slide arming lever
22 adhesive labels
24 detection area
26 proximity sensor
28 detection area
30 system according to the invention
32 controller
34 aircraft data
36 proximity sensors data
38 door input data
40 power for controller and system according to the invention
42 audio signals
44 visual/optical signals
46 receiving aircraft data
48 deciding whether aircraft is on ground and ready for disembarking
50 sensing proximity of a person
52 providing acoustic warning
54 providing optical warning
56 playback recorded voice message
58 play buzzing noise

The invention claimed is:

1. A system for preventing inadvertent slide deployment for an aircraft, comprising:
   at least one sensor for sensing the proximity of a person within a predetermined distance in front of an aircraft door, without the person having to grip or to attempting to grip a door handle; and
   at least one optical warning means operable to provide an optical indication in a vicinity of a slide arming lever when the at least one sensor detects the proximity of a person in front of the aircraft door,
   wherein the at least one sensor is arranged at a distance to the handle and to the slide arming lever,
   wherein the at least one sensor is configured to detect a person appearing or being present in a detection area in front of the aircraft door, and
   wherein the at least one sensor is arranged within the aircraft door.

2. The system according to claim 1, further comprising at least one acoustic alarm means operable to sound when the at least one sensor detects the proximity of a person within a predetermined distance in front of the aircraft door.

3. The system according to claim 1, further comprising means for activating or deactivating the at least one sensor.

4. The system according to claim 1, wherein the optical indication is a sign.

5. The system according to claim 1, wherein the at least one optical warning means is one or more light emitting devices.

6. The system according to claim 1, wherein the at least one optical warning means is a projector operable to display a sign on a surface area in the vicinity of the slide arming lever of the aircraft door.

7. The system according to claim 4, wherein the sign is an easy-to-understand pictogram indicating deployment of a slide or a deployed slide.

8. The system according to claim 1, wherein the at least one optical warning means provides a flashing sign as the optical indication.

9. The system according to claim 1, further comprising a controller operable to activate or deactivate the at least one sensor, wherein the controller is adapted to automatically activate the at least one sensor or the at least one optical warning means when the aircraft is on the ground;
wherein the controller is adapted to automatically deactivate the at least one sensor or the at least one optical warning means during flight; and
wherein the controller is adapted to receive aircraft data enabling the controller to determine whether the aircraft is on the ground.

10. The system according to claim 1, wherein the at least one sensor is an ultrasonic distance sensor.

11. The system according to claim 1, wherein the at least one sensor is a camera.

12. The system according to claim 1, further comprising at least one placard providing information about an action required to disarm the slide,
wherein the at least one optical warning means draws attention to the at least one placard.

13. The system according to claim 12, wherein the at least one placard is lighted.

14. The system according to claim 1, wherein the system is operable to direct the attention of the person to the area of the slide arming lever.

15. A method for preventing inadvertent slide deployment for an aircraft, comprising:
receiving aircraft data;
determining whether the aircraft is on the ground;
sensing proximity of a person within a predetermined distance in front of a door, without the person having to grip or to attempting to grip a door handle by at least one sensor arranged at a distance to the handle and to the slide arming lever, wherein the at least one sensor detects a person appearing or being present in a detection area in front of the aircraft door, and wherein the at least one sensor is arranged within the aircraft door; and
if a person is detected in proximity to the door, providing at least one optical warning in a vicinity of a slide arming lever.

16. The method according to claim 15, further comprising:
if a person is detected in proximity to the door, providing at least one acoustic warning.

17. An aircraft having at least one system per aircraft door for preventing inadvertent slide deployment, the system comprising:
at least one sensor for sensing the proximity of a person within a predetermined distance in front of an aircraft door, without the person having to grip or to attempting to grip a door handle; and
at least one optical warning means operable to provide an optical indication in a vicinity of a slide arming lever when the at least one sensor detects the proximity of a person in front of the aircraft door,
wherein the at least one sensor is arranged at a distance to the handle and to the slide arming lever,
wherein the at least one sensor is configured to detect a person appearing or being present in a detection area in front of the aircraft door, and
wherein the at least one sensor is arranged within the aircraft door.

* * * * *